(12) United States Patent
Wilson

(10) Patent No.: US 8,941,344 B2
(45) Date of Patent: Jan. 27, 2015

(54) VEHICLE WIPER CONTROL SYSTEM AND METHOD

(71) Applicant: Chester Wilson, Sterling Heights, MI (US)

(72) Inventor: Chester Wilson, Sterling Heights, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 149 days.

(21) Appl. No.: 13/719,270

(22) Filed: Dec. 19, 2012

(65) Prior Publication Data

US 2014/0165320 A1    Jun. 19, 2014

(51) Int. Cl.
*H02H 7/08*    (2006.01)
*B60S 1/08*    (2006.01)

(52) U.S. Cl.
CPC .............. *B60S 1/0818* (2013.01); *B60S 1/0866* (2013.01)
USPC .............................. 318/445; 318/446; 318/34

(58) Field of Classification Search
CPC ........................................................ B60S 1/08
USPC .......................................... 318/445, 446, 34
See application file for complete search history.

(56) References Cited

U.S. PATENT DOCUMENTS

| | | | |
|---|---|---|---|
| 3,089,204 A | 5/1963 | Fingeroot et al. | |
| 3,308,845 A | 3/1967 | Bellas et al. | |
| 3,523,626 A | 8/1970 | Racine et al. | |
| 3,530,525 A | 9/1970 | Abel | |
| 3,604,048 A | 9/1971 | Mainka | |
| 4,310,943 A | 1/1982 | Palma | |
| 4,387,290 A | 6/1983 | Yasuda | |
| 4,637,091 A | 1/1987 | Wu | |
| 4,719,661 A | 1/1988 | Hanselmann et al. | |
| 4,945,600 A | 8/1990 | Gastmann | |
| 5,161,849 A | 11/1992 | Holland, Jr. | |
| 5,458,690 A | 10/1995 | Longazel | |
| 5,537,705 A | 7/1996 | Battlogg | |
| 5,551,116 A | 9/1996 | DeKelaita | |
| 5,606,764 A * | 3/1997 | Zhou et al. ................. 15/250.16 |
| 5,636,407 A | 6/1997 | Len | |
| 5,648,707 A * | 7/1997 | Salliotte ........................ 318/443 |
| 5,867,858 A | 2/1999 | Kelly | |
| 5,926,905 A | 7/1999 | Longazel | |
| 6,003,193 A | 12/1999 | Rivin et al. | |
| 6,129,093 A | 10/2000 | Kelly | |
| 6,266,843 B1 | 7/2001 | Doman et al. | |

(Continued)

FOREIGN PATENT DOCUMENTS

EP    1050441 A2    11/2000
EP    1077842 A1    2/2001

(Continued)

*Primary Examiner* — David S Luo
(74) *Attorney, Agent, or Firm* — Ralph E Smith

(57) ABSTRACT

In at least one implementation, a vehicle wiper control system includes an actuator and a controller. The actuator is coupled to the wiper and operable to selectively move the wiper from a normal operating position engaged with a vehicle surface to be wiped and to a deployed position not engaged with said vehicle surface. The controller is communicated with the actuator and with a source of weather information regarding one or more weather factors, the controller being operable to cause the actuator to move the wiper from its normal position to its deployed position when one or more of the weather factors are at or beyond a threshold for said one or more weather factors. This may cause, for example, a wiper blade to be moved off of a vehicle surface if the current or predicted weather is indicative of possible snow fall or ice formation.

14 Claims, 4 Drawing Sheets

(56) References Cited

U.S. PATENT DOCUMENTS

| | | |
|---|---|---|
| 6,367,117 B1 | 4/2002 | Sahara et al. |
| 6,381,799 B1 | 5/2002 | Leutsch et al. |
| 6,449,798 B1 | 9/2002 | Rivin et al. |
| 6,913,304 B1 | 7/2005 | Sweet |
| 6,995,663 B2 | 2/2006 | Geisler et al. |
| 6,998,972 B2 | 2/2006 | Geisler et al. |
| 7,235,944 B2 * | 6/2007 | Morishita .................... 318/483 |
| 7,302,732 B2 | 12/2007 | Alley |
| 7,999,702 B2 | 8/2011 | Doyle, III |
| 8,087,712 B2 | 1/2012 | Svengalis |
| 2004/0088205 A1 | 5/2004 | Geisler et al. |
| 2004/0113799 A1 | 6/2004 | Geisler et al. |
| 2006/0196448 A1 | 9/2006 | Hayworth et al. |
| 2007/0186366 A1 | 8/2007 | Alley |
| 2008/0030370 A1 | 2/2008 | Doyle |
| 2009/0241281 A1 | 10/2009 | Couch |
| 2010/0162510 A1 | 7/2010 | Couch |
| 2010/0224040 A1 | 9/2010 | Svengalis |
| 2011/0082620 A1 * | 4/2011 | Small et al. .................... 701/29 |

FOREIGN PATENT DOCUMENTS

| | | |
|---|---|---|
| EP | 1416349 A1 | 5/2004 |
| EP | 1416349 B1 | 3/2006 |
| GB | 1092210 A | 11/1967 |
| WO | WO9624108 A1 | 8/1996 |
| WO | WO9937511 A1 | 7/1999 |
| WO | WO2006091477 A2 | 8/2006 |
| WO | WO2007117614 A2 | 10/2007 |
| WO | WO2008030671 A2 | 3/2008 |

* cited by examiner

VEHICLE WIPER CONTROL SYSTEM AND METHOD

FIELD

The present disclosure relates to vehicle wipers and more particularly to a control system for vehicle wipers.

BACKGROUND

Electrically driven wipers are known for vehicles to remove water and other matter from windows and headlights. The wipers typically have an arm driven about a pivot to sweep a wiper blade along a vehicle surface. In cold weather climates, snow and ice may accumulate on the surface to be wiped. In some instances, such snow and ice is difficult or impossible for the wiper to remove and can cause inoperability of the wipers at least until the snow and ice is sufficiently melted or dispersed.

SUMMARY

In at least one implementation, a vehicle wiper control system includes an actuator and a controller. The actuator is coupled to the wiper and operable to selectively move the wiper from a normal operating position engaged with a vehicle surface to be wiped and to a deployed position not engaged with said vehicle surface. The controller is communicated with the actuator and with a source of weather information regarding one or more weather factors, the controller being operable to cause the actuator to move the wiper from its normal position to its deployed position when one or more of the weather factors are at or beyond a threshold for said one or more weather factors. This may cause, for example, a wiper blade to be moved off of a vehicle surface if the current or predicted weather is indicative of possible snow fall or ice formation.

In at least some implementations, a method of controlling a vehicle wiper includes obtaining future predicted weather information, determining if the weather information indicates an existing or predicted weather condition at or beyond one or more thresholds, and moving a wiper to a deployed position away from a vehicle surface to be wiped if the weather information indicates an existing or predicted weather condition at or beyond said one or more thresholds. The method may be performed at any time, including upon determination of a vehicle shutdown. The method may also include moving the wiper from its deployed position back to its normal operating position at any time, including upon determination of a vehicle start-up.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
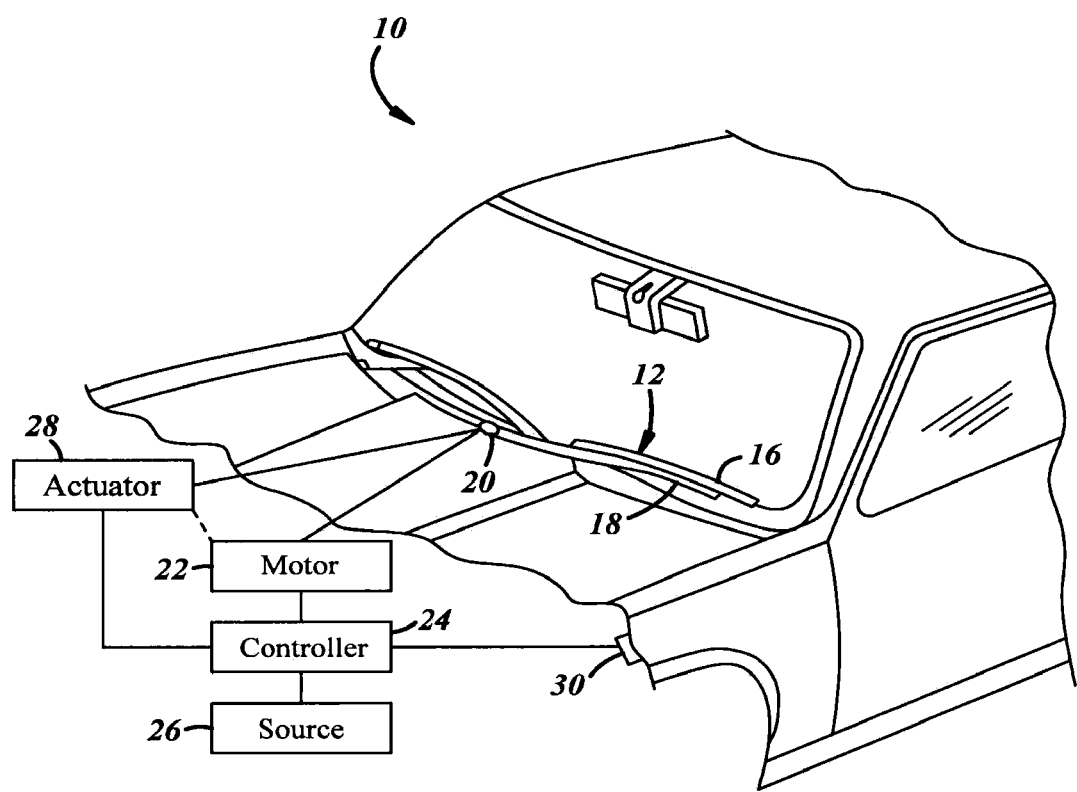
FIG. 1 is a diagrammatic view of a vehicle wiper and control system.

Referring in more detail to the drawings, FIG. 1 illustrates a vehicle wiper and control system 10 that is responsive to weather information to move a wiper 12 relative to a surface 14 to be wiped. In at least one implementation, the wiper and control system 10 operates to remove an operative surface 16 of the wiper 12 (e.g. a "wiper blade") from the vehicle surface 14 when the weather information indicates the possibility of snow, ice or freezing of the wiper blade 16 to the surface 14. In the implementation shown, the wiper 12 includes an arm 18, a mount 20 coupling the arm 18 to the vehicle and the blade 16 carried by the arm 18 for movement with the arm relative to the vehicle surface 14 to be wiped. The wiper 12 is driven by a control system 10 to permit selective operation of the wiper. The control system 10 may include a motor 22 that drives the arm 12, a controller 24 through which the motor 22 is actuated and at least one source 26 of weather related information that determines or obtains and provides such weather information, or a signal indicative thereof, to the controller 24. While one example of a wiper 12 is shown in FIG. 1, any type of wiper 12 may be used and the wiper need not be pivoted and can be otherwise coupled to the vehicle, as desired. To move the wiper blade 16 along the vehicle surface 14 (e.g. a window) in normal operation of the system 10, the motor 22 is actuated to move the wiper arm 18 so that the wiper blade 16 reciprocates along and against the vehicle surface 14. In accordance with well-known practice, the wiper 12 may be oscillated back and forth across the vehicle surface continuously or in intermittently.

The system 10 may also include an actuator 28 capable of moving the wiper blade 16 to a deployed position away from its associated vehicle surface 14. The actuator 28 may include the same motor 22 that drives the wiper arm 18 in normal operation, and/or an additional motor, and/or a solenoid driven device or other electrically driven or responsive member that actively displaces the wiper 12 or causes the wiper blade to be displaced out of contact with the vehicle surface 14. In at least certain implementations, no part of the wiper blade 16 engages the vehicle surface 14 or any surrounding area of the vehicle when the wiper 12 is in its deployed position. That is, when the wiper 12 is in its deployed position, a contact surface of the wiper blade 16 may be spaced from the vehicle and suspended in air.

To control movement of the wiper 12, the controller 24 may be communicated by any suitable means with the motor 22 and actuator 28 (which, as noted above, can be the same device). The controller 24 is operable to initiate or cause movement of the wiper 12 to its deployed position in response to certain weather related information being at or beyond a threshold. The controller 24 may use any desired software, instructions, code, and hardware to accomplish this task. The controller 24 may be independent from or part of another vehicle controller, may be carried by or located separately from the vehicle, and/or more than one controller may be used. To determine whether the wiper 12 should be moved to its deployed position, the controller 24 is communicated with at least one source 26 of weather information. The communication may be in any form (for example, wired or wireless), and by any protocol and means.

The weather information source 26 may provide information or a signal to the controller 24 indicative of current and/or future weather conditions. The source 26 may include one or more sensors 30 on the vehicle, or devices separate from the vehicle. Representative sensors 30 on the vehicle may include temperature sensors of any form such as a sensor that provides information to the controller 24 indicative of any temperature or range of temperatures as well as a sensor that provides a signal or information to the controller 24 only when a sensed temperature is beyond a threshold. Representative devices separate from the vehicle include satellite, network and/or internet based weather data for current and forecasted weather. Such devices may communicate with the vehicle generally, and/or controller 24 specifically, through one or more vehicle interfaces such as a vehicle infotainment system. The controller 24 may be part of or define the vehicle infotainment system. The infotainment system may be of any type and may be capable of receiving and transmitting information or signals of any type (generically called data herein). Such infotainment systems commonly control access to vehicle or personal music source, video source and display, data (calendar, contacts, etc) and internet access, phone system, GPS and control systems (e.g. HVAC, engine settings, ABS, etc). The system may be communicated with dedicated, private weather information or publicly available weather information. The information may come from one or more sensors or sources anywhere in the world and may relate to current and future predicted weather conditions affecting the vehicle or a geographic area close to the vehicle. The vehicle location may be determined from a vehicle or personal GPS device (e.g. a GPS docked in the vehicle) and the relevant time information may be maintained on the controller or communicated from another source either within or remote from the vehicle.

In at least some implementations, one or more threshold conditions must be met before the controller 24 causes the wiper 12 to move to its deployed position. For example, this may occur when the temperature at or in the region of the vehicle is below a certain value, say 35° F. at the time the vehicle is shut down (e.g. the vehicle engine or motor is turned off). The then existing temperature may be obtained from an on-vehicle sensor 30, a sensor separate from the vehicle, or from weather information such as from a previous forecast providing time based temperature predictions. In addition or instead, the wiper 12 may be moved to its deployed position when a predicted future temperature is below the threshold. Such future predicted temperature may be limited within a predetermined time range, if desired. For example, the range of time reviewed may be a fixed duration of time (e.g. several hours) or based on the calendar day, perhaps taking into consideration the upcoming lowest predicted temperature for the night/day when the vehicle is shut down.

In at least some implementations, one or more threshold conditions may relate to the likelihood or possibility of snow and ice on or in the area of the vehicle. Such information may be determined from one or more sensors on or separate from the vehicle, or from any other source including weather predictions. And such information may be considered over a fixed period of time or over any desired duration. Many currently available weather predictions characterize the likelihood of snow or ice as a percentage where 100% represents the highest level of certainty that snow or ice will occur and 0% representing the lowest level of such possibility. In at least some implementations, the wiper 12 may be moved to its deployed position whenever a predicted likelihood of snow or ice is above 0%. Of course, that threshold can be moved to any desired level, and could be independent of or dependent upon other weather factors individually or as one or more combinations of factors (e.g. temperature, evaporation rate, due point, etc).

The infotainment system or other controller 24 may receive weather information at any desired time. Sensor output may be received and/or information may be downloaded or received at any time including when the vehicle is shut down or in operation. In at least one implementation, the weather information is obtained or received by the controller 24 upon initial shut down of the vehicle engine. In other implementations, such information may be received periodically and the last available or received information may be used to determine whether to move the wiper 12 to its deployed position upon vehicle shut down. Of course, the decision to move the wiper to its deployed position may also be made at times other than at vehicle shut down including during vehicle operation and while the vehicle is not operating.

Figure 2:
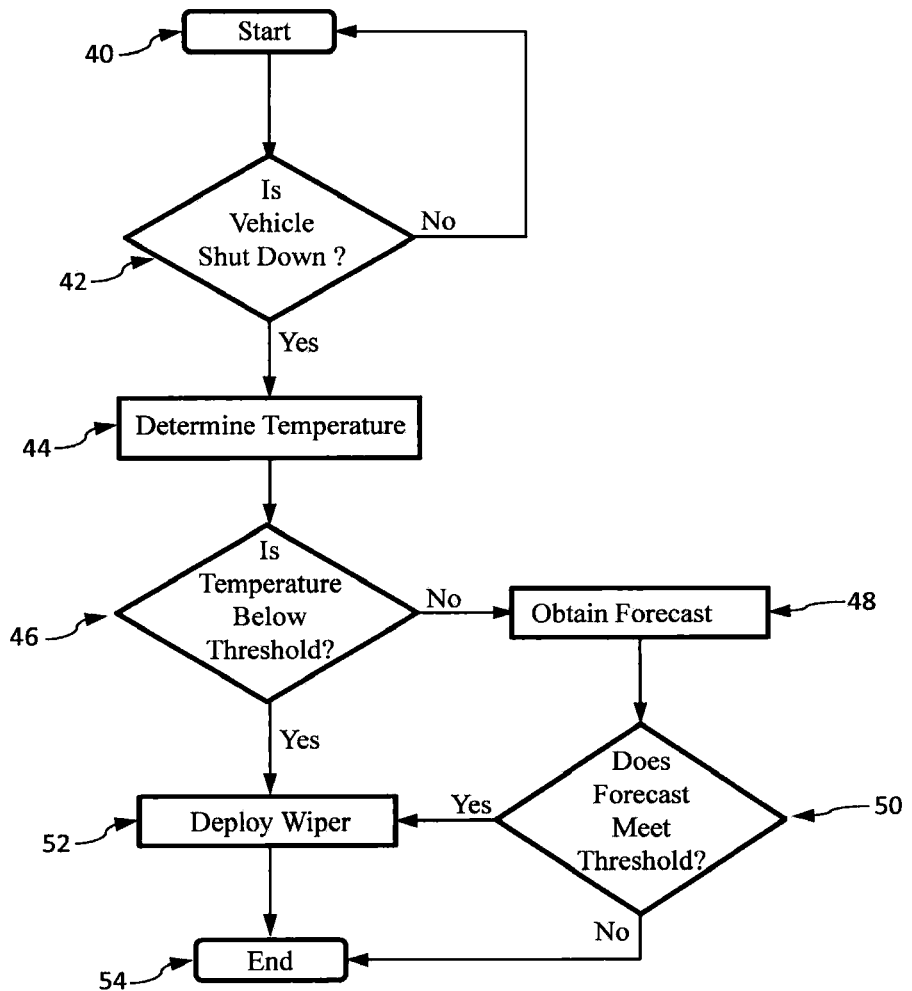
FIG. 2 is a flowchart according to a method of deploying the wiper.

One representative method for operating the system is demonstrated in the flow chart of FIG. 2. Of course, the described method is merely one example and is not intended to limit the range of possible methods that may be used. In FIG. 2, the method starts at 40 and at 42 a vehicle shut down condition is determined or sensed. A vehicle shut down may be sensed by a key off condition (ignition key turned to an off position), actuation of an engine/motor shut off button or command, cessation of engine or motor operation, or otherwise. The method may commence only upon a detected vehicle shut down, or be performed periodically, as desired. If periodically and if no vehicle shut down is detected, then the method returns to the start 40.

If a vehicle shut down is detected at 42, then the instantaneous or then current temperature is determined at 44. This may be done by downloading or receiving data at the time a vehicle shut down is detected, by using data previously obtained and/or by checking the temperature sensed by a vehicle sensor, by way of non-limiting examples. In other words, the instantaneous or then current temperature need not be an exact temperature at the vehicle but could also be a predicted temperature or other temperature data obtained by or sent to the controller. At 46 the then current temperature is compared to a threshold and if the temperature is at or below the threshold the actuator is activated to move the wiper to its deployed position. Thereafter, the process may end.

If the then current temperature is not below the threshold, then future weather forecast information may be obtained at 48 (if it hasn't already been obtained) and that information may be compared to one or more thresholds at 50. The thresholds may relate to many weather conditions (temperature, likelihood of snow, etc), as noted above, and if any one or more, or combinations, of the conditions is beyond a threshold, then the wiper may be moved to its deployed position at 52. Otherwise, the process may end 54 without the wiper being moved to its deployed position.

Figure 3:
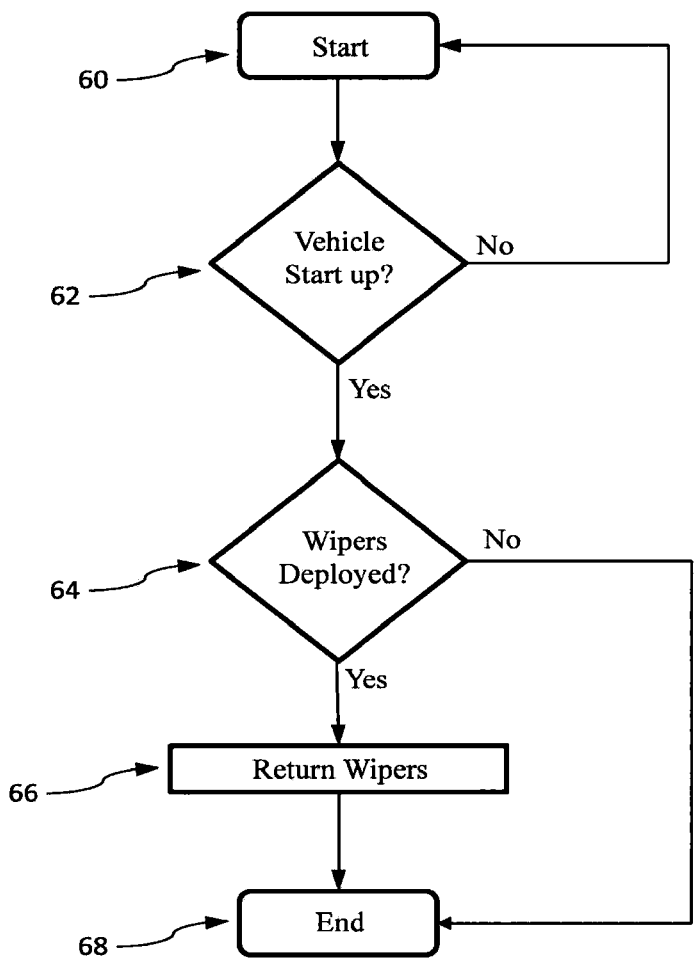
FIG. 3 is a flowchart according to a method of returning the wiper.

FIG. 3 illustrates a representative process that may be used to return a wiper from its deployed position to its normal operating position. The process starts at 60 and then determines whether a vehicle start-up has occurred. A vehicle start-up may be sensed at 62 by a key on condition (ignition key turned to an on or start position), actuation of an engine/motor turn on/start button or command, starting of engine or motor operation, or otherwise. The method may commence only upon a detected vehicle start-up, or be performed periodically, as desired. If periodically and if no vehicle start-up is detected, then the method returns to the start 60.

If a vehicle start-up is detected or determined, the process may continue by determining at 64 if the wiper is in its deployed position. If the wiper is determined to be in its deployed condition, the actuator is activated to cause the wiper to return to its normal operation position at 66 and the process ends at 68. If the wiper is determined to not be in its deployed position, hence it would be in its normal operating position, then the actuator need not be activated and the process can simply end. Of course, the actuator could be activated at every vehicle start-up or at other time to ensure that the wiper is in its normal operating position when the vehicle is operating. This could be done without checking or determining the position of the wiper. A suitable clutch or other mechanism could be connected between the actuator and wiper to prevent damage to such components if the actuator is activated when the wiper blade already is engaged with the vehicle surface.

The motor 22 may be a so-called "smart motor" which provides improved control of the wiper 12. Such a motor 22 may also know its position, and hence the position of the wiper 12, such that it might not accept an activating signal when the wiper 12 is in its normal operating position. This would avoid an unnecessary attempt to move the wiper 12 toward the vehicle surface 14 and any resulting stress on the system components in doing so. The motor 22 could also communicate to the controller 24 its position such that the controller 24 knows the wiper 12 position based on the motor position (e.g. at step 64) and does not activate the actuator 28 if the motor position is not indicative that the wiper 12 is in its deployed position. The smart motor 22 may include a controller, and that controller may receive or determine the desired weather information to control actuation of the motor and displacement of the wiper, as set forth herein. The motor controller may communicate with or be part of the infotainment system or other vehicle controller or control system.

Figure 4:
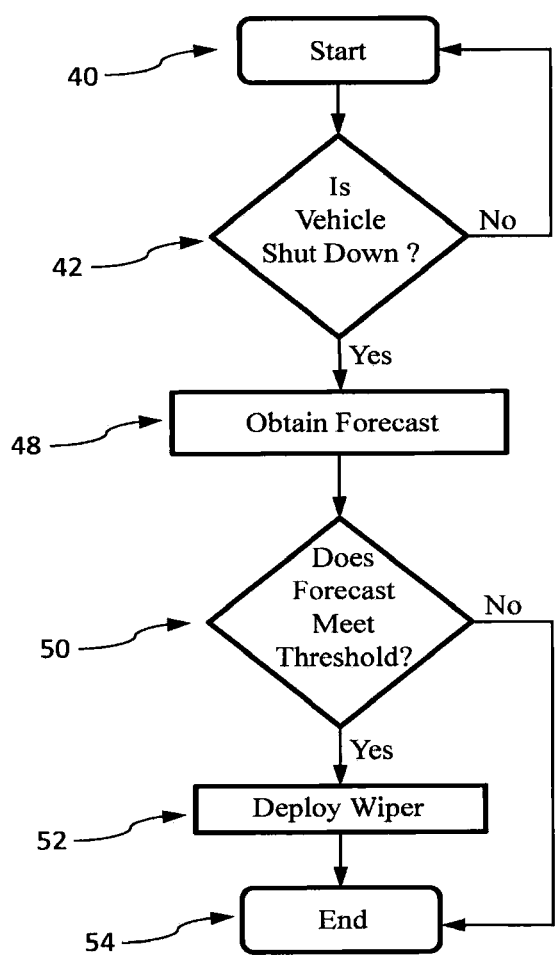
FIG. 4 is a flowchart according to a method of deploying the wiper.

Another process implementation for selectively deploying the wiper is shown in FIG. 4. This process may be the same in many respects as the process shown and described with reference to FIG. 2. However, in FIG. 4, the instantaneous temperature condition is not determined and the process instead relies upon forecasted weather information. Such forecasted data may relate to the then current weather or future predicted weather and may include information for any given period of time, as previously noted.

Accordingly, in at least some implementations, the wiper 12 may be moved to its deployed position when at least one weather factor, or combination of factors, is at or beyond a threshold. Such a threshold may be set, if desired, so that the wiper 12 is deployed whenever there is a possibility of snow or ice engaging or forming on the vehicle. This may inhibit or prevent the wiper 12 from becoming iced or snowed over and stuck to the vehicle surface 14 to be wiped (e.g. a window or windshield). Even if the wiper 12 is thereafter covered in snow and/or ice, the vehicle surface 14 can be scraped or cleaned of snow and ice without significant interference from the wiper 12 which has been moved away from the surface 14. This may inhibit or prevent damage to the wiper 12 that may be caused by engagement with an ice scraper during snow and ice removal.

While an automatic system 10 is described wherein a controller 24 is responsive to weather information to control without operator intervention the deployment of the wiper 12, the system 10 could instead or additionally be controlled manually. For example, the vehicle operator could push a button or initiate a command to activate the controller 24 when and if desired. Also, an override function could be provided such that deployment of the wiper whether manual or automatically controlled could be prevented by operator command, if desired.

What is claimed is:

1. A vehicle wiper control system, comprising:
   an actuator coupled to the wiper and operable to selectively move the wiper from a normal operating position engaged with a vehicle surface to be wiped and to a deployed position not engaged with said vehicle surface; and
   a controller communicated with the actuator and with a source of weather information regarding one or more weather factors, the controller being operable to cause the actuator to move the wiper from its normal position to its deployed position when one or more of the weather factors are at or beyond a threshold for said one or more weather factors,
   wherein the controller is responsive to a predicted temperature in the area of the vehicle that is below a threshold temperature, and
   wherein the predicted temperature includes one or both of an earlier predicted temperature for the then current time or a predicted temperature for a future time.

2. The system of claim 1 wherein the source of weather information is separate from the vehicle and received by the controller wirelessly.

3. The system of claim 2 wherein the controller is part of or receives information from an onboard vehicle system.

4. The system of claim 1 wherein the source of weather information includes an on vehicle sensor.

5. The system of claim 1 wherein the controller is responsive to a temperature in the area of the vehicle that is below a threshold temperature.

6. The system of claim 1 wherein the controller is responsive to weather information indicative of snow fall or ice formation in the area of the vehicle.

7. The system of claim 1 wherein the source of weather information is Internet based.

8. The system of claim 1 wherein the source of weather information is satellite based.

9. A method of controlling a vehicle wiper, comprising:
   obtaining future predicted weather information;
   determining if the weather information indicates an existing or predicted weather condition at or beyond one or more thresholds; and
   moving a wiper to a deployed position away from a vehicle surface to be wiped if the weather information indicates an existing or predicted weather conditional or beyond said one or more thresholds,
   wherein the step of obtaining weather information is accomplished by downloading information to a vehicle infotainment system, and
   wherein the weather information obtained includes factors related to the likelihood of snow fall or ice formation in the area of the vehicle and such one or more thresholds are set so that the wiper is moved to its deployed position if snow fall or ice formation are indicated by the weather information.

10. The method of claim 9 wherein the weather information is obtained upon a determination of vehicle shut down from an operating condition.

11. The method of claim 9 wherein the weather information is obtained periodically during vehicle operation.

12. The method of claim 9 wherein the weather information is obtained periodically whether the vehicle is operating or not.

13. The method of claim 9 which includes moving the wiper back to its normal operating position upon determination of a vehicle start-up.

14. A method of controlling a vehicle wiper, comprising:
obtaining future predicted weather information;
determining if the weather information indicates an existing or predicted weather condition at or beyond one or more thresholds; and
moving a wiper to a deployed position away from a vehicle surface to be wiped if the weather information indicates an existing or predicted weather conditional or beyond said one or more thresholds,
wherein the step of obtaining weather information is accomplished by downloading information to a vehicle infotainment system, and
wherein the weather information includes then current or future predicted temperature and the threshold is set so that the wipers are moved if the then current or future predicted temperature is 35° F. or lower.

* * * * *